United States Patent [19]

Ishikawa et al.

[11] 4,163,168

[45] Jul. 31, 1979

[54] TWO-DIRECTIONAL PIEZOELECTRIC DRIVEN FINE ADJUSTING DEVICE

[75] Inventors: Isao Ishikawa, Hino; Yoshio Sakitani, Saitama, both of Japan

[73] Assignee: Hitachi, Ltd., Japan

[21] Appl. No.: 820,011

[22] Filed: Jul. 28, 1977

[30] Foreign Application Priority Data

Jul. 28, 1976 [JP] Japan ................................ 51-89092

[51] Int. Cl.² ........................................... H01L 41/10
[52] U.S. Cl. .................................................. 310/328
[58] Field of Search ................................. 310/26, 328

[56] References Cited

U.S. PATENT DOCUMENTS

| 3,377,489 | 4/1968 | Brisbane | 310/328 |
| 3,952,215 | 4/1976 | Sakitani | 310/328 |

*Primary Examiner*—Mark O. Budd
*Attorney, Agent, or Firm*—Craig and Antonelli

[57] ABSTRACT

A floating piece is provided between a fixed base and a movable plate which are arranged in parallel spaced relationship, the floating piece being engaged with the fixed base for movement only in the X direction and being engaged with the plate for movement only in the Y direction. First counter piezoelectric members capable of expanding or contracting in the X direction in response to an applied voltage and second counter piezoelectric members capable of expanding and contracting in the Y direction in response to an applied voltage are connected to the floating piece. Sliders are disposed at the ends of the piezoelectric members which slide on the base and movable plate, respectively, the sliders being provided with electrically operated attractors which serve to attract and fasten the sliders to the base and plate. By selective application of voltage signals to the piezoelectric members and the attractors, the plate can be made to move simultaneously in orthogonal directions with respect to the base under the guidance of the floating piece.

18 Claims, 11 Drawing Figures

TWO-DIRECTIONAL PIEZOELECTRIC DRIVEN FINE ADJUSTING DEVICE

BACKGROUND OF THE INVENTION

1. Field of the Invention

This invention relates to a fine adjusting device for fine adjustment of the position of an object. More particularly, it relates to a two-directional fine adjusting device which makes it possible to move an object to any desired position on a two-dimensional plane and to precisely locate the object to the position.

2. Description of the Prior Art

Purely mechanical as moving mechanisms for finely adjusting the position of an object, have heretofore been generally employed. In such purely mechanical fine adjusting devices, however, mechanical play inevitably exists in the joint portions of the mechanical elements, such as the feed screw portion and carriage portion. This leads to the disadvantage that the play in successive elements adds up to cause a great positioning error. Further, the carriage is held by V-grooves and balls. Because of liminations on the accuracy of finishing of the V-grooves, the arrangement of the balls, etc., it is next to impossible to achieve movement of a sample with the required degree of linearity, and as a result accurate fine adjustment and positioning are difficult to attain.

In order to solve the problems of the purely mechanical fine adjusting device, novel devices which can carry out movements of very small units at high accuracy by employing only electrical signals have been proposed in Stanford Research Institute (hereinbelow, abbreviated to "SRI"): Physical Electronics Research Brief, No. 17, June 1975; Japanese Official Patent Gazette: Patent Application Publication No. 12497/1976 entitled "Step Fine Adjusting Device"; etc. The principle employed is characterized in that, by exploiting a very small expansion or contraction of a member having a counter piezoelectric effect which arises when a voltage is applied to the member, a desired fine adjusting motion is conducted purely electrically.

Hereunder, before presenting an explanation of this invention, an invention of Japanese Patent Application No. 60017/1976 entitled "Fine Adjusting Device" which has previously been proposed by the present inventors and which is now pending in Japan (not yet laid open) will be described with reference to FIG. 1. In the figure, numerals 10, 10' designate expansible and contractible members which employ a material presenting a counter piezoelectric effect (the effect in which the material expands or contracts by applying a voltage thereto). Such members are made of piezoelectric ceramics whose electromechanical coupling coefficient is great. In order to obtain the maximum counter piezoelectric effect, the members are shaped into cylinders. Of course, the cylindrical shape is not restrictive; the piezoelectric material in any other desired shape, such as a prismatic shape and flat shape, may be employed. While two separated counter piezoelectric members 10, 10' are used in this example, it is needless to say that an integral counter piezoelectric member may be adopted in view of the function. Electrodes for applying a voltage, 10A, 10'A and 10B, 10'B are respectively deposited on the inner and outer peripheral surfaces of the counter piezoelectric members 10, 10'. A variable DC power source $E_3$ is connected between the inner and outer electrodes through a switch $S_3$. The counter piezoelectric members 10, 10' lengthen (or shorten) in the axial direction in proportion to the voltage applied between the inner and outer electrodes. That is, the switch $S_3$ and the variable DC power source $E_3$ constitute electric signal generating means for lengthening or shortening the counter piezoelectric members 10, 10'. Numeral 13 indicates a mount which supports the counter piezoelectric members 10, 10' and which is anchored onto a fixed base 18. One end of each counter piezoelectric member 10, 10' is fixed to the mount 13 by a binder 11B, 11'B through an insulator ring 12B, 12'B. Shown at 19, 19' are sliders which are attached to the other end parts of the counter piezoelectric members 10, 10'. They are made of blocks of a conductive material 14, 14' on which semiconductor material layers 16, 16' are deposited. The slide members 19, 19' are respectively fixed to the end parts of the counter piezoelectric members 10, 10' by binder portions 11A, 11'A through insulator rings 12A, 12'A. The counter piezoelectric members 10, 10' and the slide members 19, 19' are disposed bilaterally symmetrically with respect to the mount 13, respectively. While, in the above explanation, the slide members 19, 19' are constructed of the blocks of a conductive material 14, 14' and attractors which are made of the semiconductor material layers 16, 16' fixed to the blocks by the conductive binder portions 15, 15', an insulator material may be used for the attractors instead of the semiconductor material as taught in the foregoing literature of SRI. Numeral 17 represents a movable plate, for example, a flat plate, made of a conductive material. DC power sources $E_1$, $E_2$ are connected between the flat plate 17 and the conductive material blocks 14, 14' of the slider members 19, 19' through switches $S_1$, $S_2$, respectively. When voltages are applied between the flat plate 17 and the conductive material blocks 14, 14' of the slide members 19, 19' by closing the switches $S_1$, $S_2$, great electrostatic attractive forces (i.e., coulomb forces) act between both the constituents 17 and 14, 14' with the semiconductor material layers 16, 16' intervening therebetween. Thus, the slide members 19, 19' are attracted and fastened to the flat plate 17, and a desired location of the flat plate 17 is fixed. That is, the switches $S_1$, $S_2$ and the DC power sources $E_1$, $E_2$ which are connected between the slider members 19, 19' and the flat plate 17 constitute electric signal generating means for attracting and fastening the flat plate 17 and the slide members 19, 19'. In the device constructed as stated above, the electrically secured states between the flat plate 17 and the slide members 19, 19' fixed to the end parts of the counter piezoelectric members 10, 10' are alternately released, and the counter piezoelectric members 10, 10' are lengthened (or shortened) in the meantime, whereby the flat plate 17 can be moved as will be stated later. That is, the flat plate which is a subject to be finely adjusted (or an object which is placed on the flat plate) can be easily moved.

Hereunder, the moving operation of the device shown in FIG. 1 will be described with reference to FIGS. 2-a to 2-g. In these figures, in order to facilitate understanding, the insulator rings 12A, 12B, 12'A, 12'B, the portions of a binder 11A, 11B, 11'A, 11'B, the portions of a conductive binder 15, 15' and the semiconductor material layers 16, 16' are omitted from the illustration. When the slide members 19, 19' are located (attracted and fastened to the flat plate 17), they are illustrated in contact with the lower surface of the flat plate 17. Conversely, when they are released from the location, they are illustrated in separation from the lower surface of the flat plate 17.

Now, consider as the reference a state under which all the switches $S_1$, $S_2$ and $S_3$ are closed as in FIG. 2-a. In this state, each of the cylindrical counter piezoelectric members 10, 10' presents an elongation $\Delta$ proportional to the applied voltage $E_3$ in the axial direction by the counter piezoelectric effect. Both the slide members 19, 19' at both the ends of the members 10, 10' are located by the coulomb forces which act between the members 19, 19' and the flat plate 17. When the switch $S_1$ is firstly opened from this state, the coulomb force which has existed between the slide member 19 and the flat plate 17 disappears, and the restraint between the slide member 19 and the flat plate 17 is released as shown in FIG. 2-b. When the switch $S_3$ is subsequently opened, the elongation $\Delta$ of each of the counter piezoelectric members 10, 10' disappears. Then, the slide member 19' moves by $\Delta$ leftwards as shown in FIG. 2-c, and simultaneously, also the flat plate 17 moves by $\Delta$ leftwards. Thereafter, the switch $S_1$ is closed, to attract and fasten the slide member 19 to the flat plate 17 as shown in FIG. 2-d. At the next step, the switch $S_2$ is opened to release the restraint of the slide members 19' as shown in FIG. 2-e. When the switch $S_3$ is subsequently closed, each of the counter piezoelectric members lengthens by $\Delta$ again. Then, as shown in FIG. 2-f, the slide member 19 moves by $\Delta$ leftwards, and therewith, the flat plate 17 further moves by $\Delta$ leftwards. When the switch $S_2$ is closed here, the slide member 19' is again located, and a state in FIG. 2-g which is the same as the reference state in FIG. 2-a is established. In this case, however, the flat plate 17 has moved leftwards by $2\Delta$ from the original position.

By repeating such switching operation, the flat plate 17 can be moved step by step leftwards for every unit elongation $2\Delta$ of the counter piezoelectric members 10, 10'. In the case where conversely, the flat plate 17 is to be moved rightwards, the opening and closing sequence of the switches $S_1$, $S_2$ and $S_3$ may be made quite the converse to the above. Such a switching operation can be conducted with a simple electric circuit, and moreover, it can be readily automated. As to the electric signal generating means, it is needless to say that pulse signal sources synchronized with one another may be employed as the power sources $E_1$, $E_2$ and $E_3$ and that the switches may be ommitted. In such case, the speed of the stepping movement can be varied as desired by varying the recurrence period of the pulses.

The fine adjusting device based on the principle described above involves no mechanical play, and therefore, has the advantage that the accuracy of fine adjustment and the accuracy of positioning are remarkably high. However, in the case where the object is to be moved in any desired direction on a two-dimensional plane by such principle of fine adjustment, the following problems take place. By way of example, a construction is considered wherein two of the unidirectional fine adjusting devices as described above are provided, and one of the devices is placed on the other, whereby the one device is used for fine adjustment in the X-axial direction and the other device for fine adjustment in the Y-axial direction. In this case, the simultaneous movements in the X-axial direction and Y-axial direction are possible, but there is the disadvantage that the whole apparatus becomes structurally complicated and large-sized. It is also proposed to attach two sets of counter piezoelectric members, extending in the X-axial and Y-axial directions, to the mount 13 of the foregoing fine adjustment device and to alternately execute the movements of the flat plate 17 in the X-axial and Y-axial directions, thereby to simplify the construction of the apparatus. In this case, since the X- and Y-directional movements cannot be carried out at the same time, there is the disadvantage that a long time is required for the necessary two-dimensional movement.

SUMMARY OF THE INVENTION

An object of this invention is to eliminate the disadvantages of the prior art and to provide a fine adjusting device which can move an object to a desired position in two directions or along X- and Y-axes at good accuracies of fine adjustment and positioning and operate simultaneously in the respective axial directions, which can sharply shorten the period of time required for the movement, which is structurally simple.

In order to accomplish this object, this invention comprises two counter piezoelectric members which are inserted between a fixed base and a movable plate and which are mechanically fixed to each other, a first pair of slide members which are mechanically fixed to one of the counter piezoelectric members and which are equipped with attractors for effecting electrical attraction between them and the movable plate, a second pair of slide members which are mechanically fixed to the other counter piezoelectric member and which are equipped with attractors for effecting electrical attraction between them and the fixed base, first and second electric signal generating means for impressing electric signals for expansion and contraction on the two counter piezoelectric members, third and fourth electric signal generating means for impressing electric signals for attraction between the first pair of slide members and the movable plate, and fifth and sixth electric signal generating means for impressing electric signals for attraction between the second pair of slide members and the fixed base, the expanding-and-contracting directions of the two counter piezoelectric members being different from each other, the first to sixth electric signal generating means being appropriately controlled, whereby the movable plate (or an object to-be-moved placed thereon) is finely adjusted to any desired position on a two-dimensional plane.

Other objects and features of this invention and functional effects achieved thereby will be self-explanatory from the following detailed description of embodiments.

DESCRIPTION OF THE PREFERRED EMBODIMENTS

Figure 1:
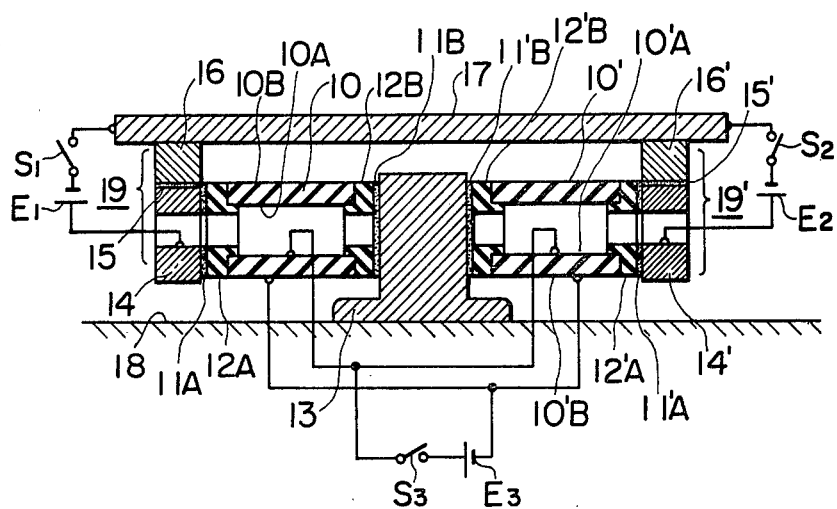
FIG. 1 is a schematic vertical sectional view showing the principle construction of a fine adjusting device which exploits the counter piezoelectric effect.
Figure 3:
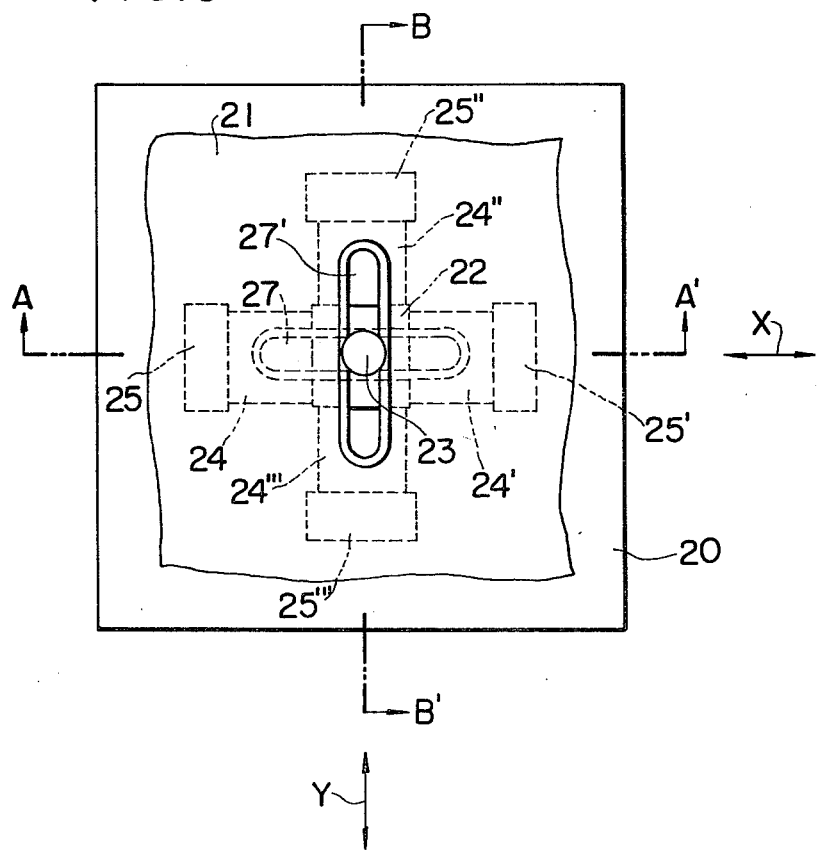
FIG. 3 is a schematic plan view showing the principle construction of an improved two-directional fine adjusting device according to this invention.
Figure 2A:
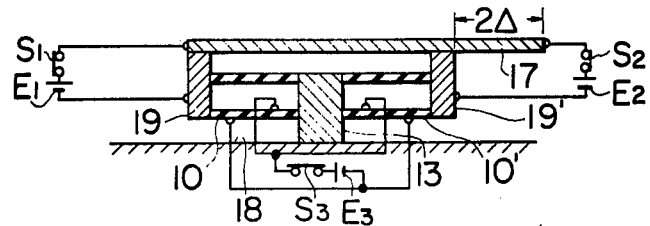
FIGS. 2-a to 2-g are model diagrams for explaining the operation of the fine adjusting device shown in FIG. 1.
Figure 2B:
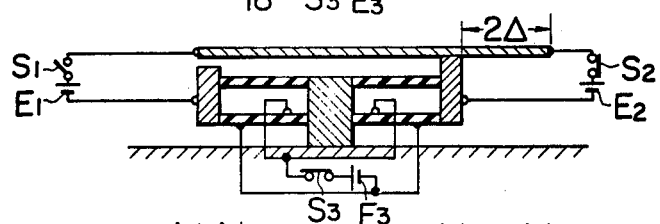
Figure 2C:
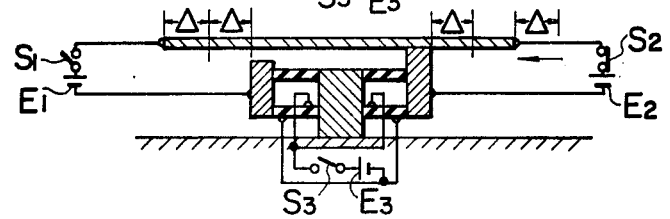
Figure 2D:
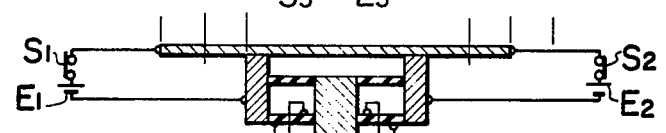
Figure 2E:
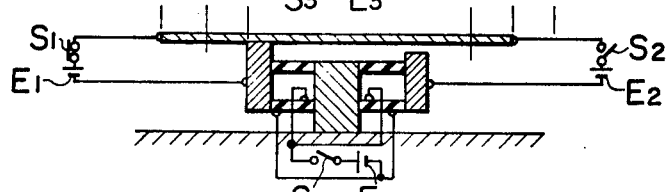
Figure 2F:
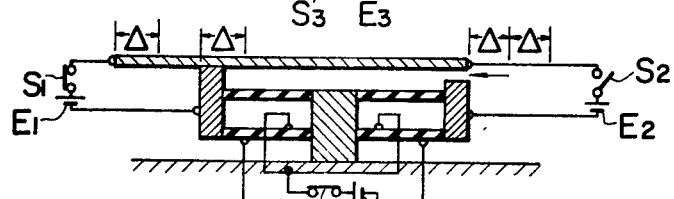
Figure 2G:
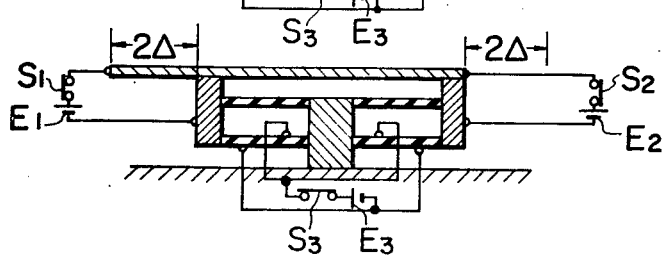
Figure 4A:
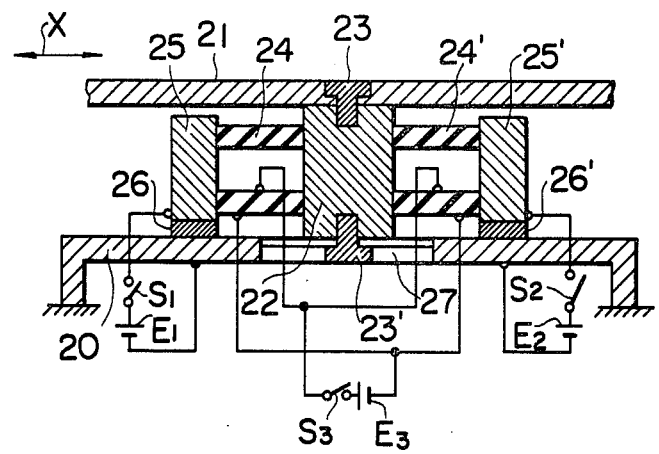
FIGS. 4-a and 4-b are schematic vertical sectional views taken along plane A—A' and plane B—B', respectively.
Figure 4B:
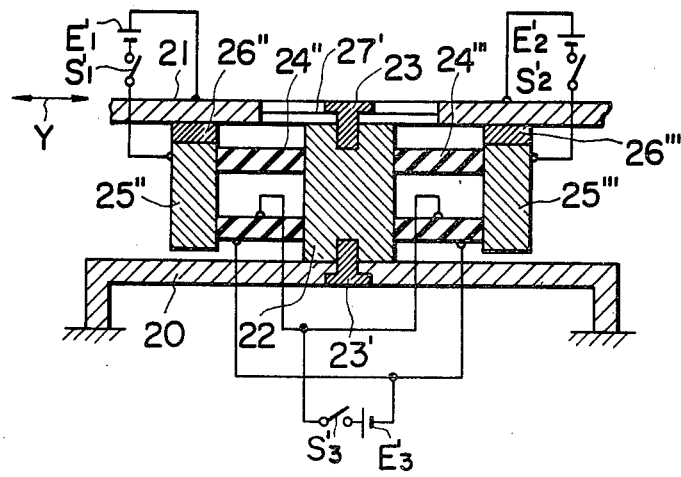

Hereunder, the fine adjusting device of this invention will be described in detail with reference to the drawing. FIG. 3 and FIGS. 4-a and 4-b shown an embodiment of this invention. In these figures, numeral 20 designates a fixed base, and numeral 21 a movable plate, for example, a flat plate, which is provided in opposition to and in parallel with the base 20. Also in this embodiment, the subject to be finely adjusted is the flat plate 21 or an object (not shown) fixed and placed thereon. Numerals 24, 24' designate first counter peizoelectric members which are disposed in an X-axial direction, while numerals 24", 24''' indicate second counter piezoelectric members which are disposed in a Y-axial direction orthogonally intersecting with the X-axis. The counter piezoelectric members 24, 24', 24", 24''' are made of cylinders of a material having the piezoelectric effect as in the previous description, and they are respectively fixed to a floating piece 22 which is interposed between the fixed base 20 and the flat plate 21. Among the counter piezoelectric members, respective sets of members 24 and 24' and members 24" and 24''' function to expand and contract along the X-axis and along the Y-axis. As in the foregoing prior-art example, therefore, the members 24 and 24' and the members 24" and 24''' may of course be made integral respectively. Numerals 25, 25' represent a first pair of slide members which are fixed to end parts of the first counter piezoelectric members 24, 24', while numerals 25", 25''' denote a second pair of slide members which are fixed to end parts of the second counter piezoelectric members 24", 24'''. The respective pairs of slide members are made of blocks of a conductive material in which attractors formed of layers of a semiconductor material 26, 26' and 26", 26''' are installed on slide surfaces with the fixed base 20 and with the flat plate 21. The first slide members 25, 25' are formed so as to come into slide contact with the fixed base 20, and the second slide members 25", 25''' are formed so as to come into slide contact with the flat plate 21. The floating member 22 is disposed at a point of intersection at which the first counter piezoelectric members 24, 24' and the second counter piezoelectric members 24", 24''' intersect orthogonally. The member 22 fixes and supports both the counter piezoelectric members, and is slidable in the X-direction relative to the fixed base 20 and in the Y-direction relative to the movable plate 21. Numerals 23, 23' represent set-screws. One set-screw 23 is loosely fitted in a guide slit 27' provided in the flat plate 21 and extending in the Y-axial direction, and it is threadably secured to the floating member 22 on the upper side thereof. The other set-screw 23' is loosely fitted in a guide slit 27 provided in the fixed base 20 and extending in the X-axial direction, and it is threadably secured to the floating member 22 on the lower side thereof. Owing to the set-screws 23, 23' and the guide slits 27', 27, the moving direction of the floating piece 22 relative to the fixed base 20 is limited only to the X-axial direction, the moving direction of the flat plate 21 relative to the floating member 22 is limited only to the Y-axial direction, and motions in the direction orthogonally intersecting with the X-Y plane of the flat plate 21 or in the vertical direction relative to the fixed base 20 are favorably checked. In principle, however, the set-screws and the guide slits may be dispensed with. Electrodes made of conductive thin films (not shown) are provided on inner and outer peripheral surfaces of the first counter piezoelectric members 24, 24' and inner and outer peripheral surfaces of the second counter piezoelectric members 24", 24'''. In order to expand and contract the counter piezoelectric members 24, 24' and 24", 24''', variable DC power sources $E_3$ and $E'_3$ are respectively connected between the inner and outer electrodes through switches $S_3$ and $S'_3$ as in the previous description. That is, the switches $S_3$, $S'_3$ and the variable DC power sources $E_3$, $E'_3$ constitute first and second electric signal generating means for controlling the expansion and contraction of both the counter piezoelectric members. DC power sources $E_1$ and $E_2$ are respectively connected through a switch $S_1$ and a switch $S_2$ between the fixed base 20 and the slide member 25 and between the fixed base 20 and the slide member 25', while DC power sources $E'_1$ and $E'_2$ are respectively connected through a switch $S'_1$ and a switch $S'_2$ between the flat plate 21 and the slide member 25" and between the flat plate 21 and the slide member 25'''. By controlling the opening and closure of the switches $S_1$, $S_2$, $S'_1$, $S'_2$, the electrical attraction and release between the slide members and the fixed base or the flat plate are carried out. Although not shown in the drawing, insulator plates etc. are disposed for insulation between the slide member 25 and the counter piezoelectric member 24, between the slide member 25' and the counter piezoelectric member 24', between the slide member 25" and the counter piezoelectric member 24", between the slide member 25''' and the counter piezoelectric member 24''', and between the respective counter piezoelectric members 24, 24', 24", 24''' and the floating member 22.

In the fine adjusting device thus constructed, in the case where voltages are applied between the fixed base 20 and the first pair of slide members 25, 25' in accordance with the same moving principle as in the moving operation stated with reference to FIGS. 2-a to 2-g, the first pair of slide members 25, 25' and the fixed base 20 are held in the secured state by the coulomb forces acting between the components 20 and 25, 25', and hence, the flat plate 21 becomes capable of only the movement along the guide slit 27', i.e., the movement in the Y-axial direction. Conversely, in the case where voltages are applied between the flat plate 21 and the second pair of slide members 25", 25''', the second pair of slide members 25", 25''' and the flat plate 21 are held in the secured state by the coulomb forces acting therebetween as stated above, and hence, the flat plate 21 becomes capable of only the movement along the guide slit 27 provided in the fixed base 20, i.e., the movement in the X-axial direction. In the case where, either of the first pair of slide members 25, 25' is unsecured and either of the second pair of slide members 25", 25''' is unsecured, expansion and contraction of both the counter piezoelectric members can occur, and therefore, the X-axial direction movement and Y-axial direction movement of the flat plate 21 can be effected at the same time. Accordingly, not only the individual movements in the X- and Y-axial directions but also the simultaneous movements in the X- and Y-axial directions are possible in such a way that the switches $S_3$, $S'_3$ controlling the expansion and contraction of the counter piezoelectric members 24, 24', 24", 24''', the switches $S_1$, $S_2$ for regulating the movement of the flat plate 21 in the X-axial direction, and the switches $S'_1$, $S'_2$ regulating the movement of the flat plate 21 in the Y-axial direction are appropriately and intermittently changed-over. Owing to the simultaneous movements, the object, such as sample placed on the flat plate 21, can be moved to a predetermined position on the plane in a very short time. Although, in the embodiment shown in FIGS. 3 and 4-a and 4-b, the two counter piezoelectric members are provided in each of the X- and Y-axial directions, only one counter piezoelectric member may be disposed in each of the X- and Y-axial directions.

In the above embodiment, the axial direction of the counter piezoelectric members disposed in the X-axial direction and that of the counter piezoelectric members disposed in the Y-axial direction, in other words, the expanding-and-contracting directions of the respective counter piezoelectric members intersect orthogonally to each other. Needless to say, however, in view of the purpose of finely adjusting the object to any desired position on the two-dimensional plane, the expanding-and-contracting directions of the two counter piezoelectric members are not restricted only to the relation of the orthogonal intersection, but they may intersect obliquely to each other.

In the above explanation, the shape of the counter piezoelectric members is cylindrical, and the expanding-and-contracting directions thereof are limited to the axial directions of the cylinders. It is apparent from known techniques, however, that the shape of the counter piezoelectric members need not always be cylindrical as stated previously. For example, a technique has been known wherein a single sheet-like counter piezoelectric member which is formed with electrodes on both its surfaces is employed in order to similarly move an object to a desired position on a two-dimensional plane (refer to, e.g., "SRI: Physical Electronics Research Brief; No. 17, June 1975" mentioned previously). In the case of such a construction, the expansion and contraction of the sheet-like counter piezoelectric member occurs not in only one direction, but in all directions (fully covering 360°). It is accordingly apparent that the factor for determining the directions of the fine adjustments is the arrayal direction of the pair of slide members which are mechanically fixed to the counter piezoelectric member. Therefore, in the case of effecting fine adjustment of the object to any desired position on the two-dimensional plane using such a construction, it is necessary that the array directions of the respective pairs of the minimally required two pairs of slide members be different from each other. It is to be understood that, in accordance with this invention, the expanding and contracting direction of the counter piezoelectric member shall cover such case.

In the above explanation of this invention, the slide member is a block of a conductive material equipped with the attractor of a semiconductor material or insulator material on the side of the slide surface, and the coulomb force is caused to act between it and the opposing member (fixed base or movable plate) which is also made of a conductive material. However, a layer of a semiconductor material or insulator material may be deposited also on the surface of the opposing member as taught in the aforecited literature of SRI. Further, it is natural in the light of the principle that coulomb forces act when thin films of such material are formed only on the surfaces of the opposing members. However, considering the fact that the coulomb forces can be generated uniformly on the attractive surfaces and that the manufacture is easy, it is most suitable to provide the layers of a semiconductor material on only the attractive surfaces of the slide members. Each of the fixed base and the movable plate need not be of a conductive material entirely, but they may be formed of an insulator in which a conductive material is deposited on a surface portion to come into contact with the slider.

As understood from the detailed description thus far made, this invention consists in a construction wherein, in order to move an object to any desired position on a two-dimensional plane by minute unit distances and at high speed, two counter piezoelectric members which are fixed to each other and whose expanding-and-contracting directions are different are inserted between a fixed base and a movable plate, a pair of slide members which are equipped with attractors for effecting electrical attraction between one of the counter piezoelectric members and the movable plate are mounted on the one counter piezoelectric member, and a pair of slide members which are equipped with attractors for effecting electrical attraction between the other counter piezoelectric member and the fixed base are mounted on the other counter piezoelectric member. That is, according to this invention, movements in two directions different from each other can be simultaneously executed with the comparatively simple construction, ultimately making it possible to move the object with high accuracy and at high speed. The industrial value of the invention is very great.

We claim:

1. A two-directional fine adjusting device comprising a fixed base, a movable plate, first and second counter piezoelectric members which are fixed to each other and which are expandable and contractable in directions different from each other in response to selective application of electric signals, first and second slide members which are respectively fixed to two points in the expanding and contracting direction of said first counter piezoelectric member and which come into slide contact with said fixed base, first and second electrical attraction means responsive to applied electric signals for attracting and fastening the respective first and second slide members to said fixed base, third and fourth slide members which are respectively fixed to two points in the expanding and contracting direction of said second counter piezoelectric member and which come into slide contact with said movable plate, third and fourth electrical attraction means responsive to applied electric signals for attracting and fastening the respective third and fourth slide members to said movable plate, means for selectively applying electric signals for expansion and contraction to the respective first and second counter piezoelectric members, and means for selectively supplying electric signals to said first, second, third and fourth electrical attraction means to effect operation thereof.

2. A two-directional fine adjusting device according to claim 1, wherein the expanding and contracting directions of said first and second counter piezoelectric members intersect orthogonally to each other.

3. A two-directional fine adjusting device according to claim 1, wherein said first and second counter piezoelectric members are disposed between said fixed base and said movable plate.

4. A two-directional fine adjusting device according to claim 1, wherein said first and second counter piezoelectric members are fixed to each other at respective central parts thereof in the respective expanding and contracting directions thereof, said first and second slide members are fixed at both ends of said first counter piezoelectric member in expanding and contracting direction thereof, and said third and fourth slide members are fixed at both ends of said second counter piezoelectric member in the expanding and contracting direction thereof.

5. A two-directional fine adjusting device according to claim 1, wherein said first and second electrical attraction means include layers of a semiconductor material which are provided between said fixed base and said respective first and second slide members, and said third and fourth electrical attraction means include layers of a semiconductor material which are provided between said movable plate and said respective third and fourth slide members.

6. A two-directional fine adjusting device according to claim 5, wherein said layers of a semiconductor material are fixed to the respectively corresponding slide members.

7. A two-directional fine adjusting device according to claim 1, wherein said first and second counter piezoelectric members are respectively formed into the shape of hollow cylinders which respectively lengthen and shorten in the axial directions of the cylinders in response to selective application of electric signals.

8. A two-directional fine adjusting device according to claim 1, wherein said fixed base has a slot therein extending in the expanding and contracting direction of said first counter piezoelectric member and said movable plate has a slot therein extending in the expanding and contracting direction of said second counter piezoelectric member, a floating piece having one end engaged in the slot in said base and the other end engaged in the slot in said plate, and wherein said first and second counter piezoelectric members are fixed to said floating piece.

9. A two-directional fine adjusting device according to claim 8, wherein said first and second slide members are fixed at both ends of said first counter piezoelectric member in the expanding and contracting direction thereof, and said third and fourth slide members are fixed at both ends of said second counter piezoelectric member in the expanding and contracting direction thereof.

10. A two-directional fine adjusting device according to claim 9, wherein said first and second electrical attraction means include layers of a semiconductor material which are provided between said fixed base and said respective first and second slide members, and said third and fourth electrical attraction means include layers of a semiconductor material which are provided between said movable plate and said respective third and fourth slide members.

11. A two-directional fine adjusting device according to claim 10, wherein said first and second counter piezoelectric members are respectively formed into the shape of hollow cylinders which respectively lengthen and shorten in the axial directions of the cylinders in response to selective application of electric signals.

12. A two-directional fine adjusting device according to claim 11, wherein the expanding and contracting directions of said first and second counter piezoelectric members intersect orthogonally to each other.

13. A two-directional fine adjusting device according to claim 1, wherein said first and second counter piezoelectric members, said first, second, third and fourth electrical attraction means, and said means for selectively applying signals to the respective first and second counter piezoelectric members and said means for selectively applying electric signals to said first, second, third and fourth electrically attraction means enable movement of said movable plate relative to said fixed base simultaneously in the different directions of expansion and contraction of said first and second counter piezoelectric members.

14. A two-directional fine adjusting device according to claim 13, wherein the different directions are substantially perpendicular to one another.

15. A two-directional fine adjusting device comprising a fixed base, a movable plate, first piezoelectric means for expanding and contracting in a first direction in response to selective application of electric signals, second piezoelectric means for expanding and contracting in a second direction in response to selective application of electric signals, fastening means for fastening and unfastening predetermined portions of said first and second piezoelectric means with respect to at least one of said fixed base and said movable plate in response to selective application of electric signals, means for connecting said first and second piezoelectric means, said connecting means being coupled to said fixed base and to said movable plate, and means for selectively applying electric signals to said first and second piezoelectric means and to said fastening means for enabling movement of said movable plate relative to said fixed base simultaneously in said first and second directions.

16. A two-directional fine adjusting device according to claim 15, wherein said first and second directions are substantially perpendicular to one another.

17. A two-directional fine adjusting device according to claim 15, wherein said fastening means enables fastening of said first piezoelectric means to said fixed base and enables fastening of said second piezoelectric means to said movable plate.

18. A two-directional fine adjusting device according to claim 15, wherein said fixed base has a slot therein extending in said first direction and said movable plate has a slot therein extending in said second direction, said connecting means including a floating piece having one end engaged in the slot in said base and the other end engaged in the slot in said movable plate.

* * * * *